US012665662B2

(12) United States Patent
Grilli et al.

(10) Patent No.: US 12,665,662 B2
(45) Date of Patent: Jun. 23, 2026

(54) EVENT TRIGGERED SATELLITE COMMUNICATIONS

(71) Applicant: QUALCOMM Incorporated, San Diego, CA (US)

(72) Inventors: Francesco Grilli, La Jolla, CA (US); Vivek Khanna, San Diego, CA (US); Sivaramakrishna Veerepalli, San Diego, CA (US); Shailesh Patil, San Diego, CA (US); Gene Wesley Marsh, San Diego, CA (US); Cheng Tan, Denver, CO (US); Jungsik Park, San Diego, CA (US); Carl Hardin, Encinitas, CA (US); Rashmin Anjaria, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 18/360,297

(22) Filed: Jul. 27, 2023

(65) Prior Publication Data

US 2024/0146403 A1 May 2, 2024

Related U.S. Application Data

(60) Provisional application No. 63/381,213, filed on Oct. 27, 2022.

(51) Int. Cl.
H04B 7/185 (2006.01)
(52) U.S. Cl.
CPC ..... H04B 7/18519 (2013.01); H04B 7/18513 (2013.01)

(58) Field of Classification Search
CPC ............ H04B 7/18519; H04B 7/18541; H04B 7/18513; H04B 7/18534
USPC ......................................................... 370/316
See application file for complete search history.

(56) References Cited

U.S. PATENT DOCUMENTS

| | | | | |
|---|---|---|---|---|
| 8,078,162 | B2 * | 12/2011 | Deaton | H04Q 3/0079 |
| | | | | 455/431 |
| 10,650,621 | B1 * | 5/2020 | King | G07C 5/0816 |
| 10,743,248 | B2 * | 8/2020 | Davies | H04W 28/0236 |
| 12,075,323 | B2 * | 8/2024 | Oba | G08B 25/08 |
| 2004/0142678 | A1 | 7/2004 | Krasner | |
| 2004/0198366 | A1 | 10/2004 | Crocker et al. | |

(Continued)

FOREIGN PATENT DOCUMENTS

WO        WO-2022061664 A1        3/2022

OTHER PUBLICATIONS

International Search Report and Written Opinion—PCT/US2023/031532—ISA/EPO—Dec. 20, 2023.

*Primary Examiner* — Christopher M Crutchfield
*Assistant Examiner* — Syed Ahmed
(74) *Attorney, Agent, or Firm* — Harrity & Harrity, LLP

(57) ABSTRACT

Various aspects of the present disclosure generally relate to wireless communication. In some aspects, a user equipment (UE) may detect a trigger event associated with a satellite communication link, the trigger event being based at least in part on at least one of: a status of an access link associated with the UE, or information associated with another device or a component of the UE. The UE may transmit a communication via the satellite communication link based at least in part on detecting the trigger event. Numerous other aspects are described.

30 Claims, 7 Drawing Sheets

(56) References Cited

U.S. PATENT DOCUMENTS

| | | | |
|---|---|---|---|
| 2013/0295912 A1* | 11/2013 | Chen | H04W 4/44 |
| | | | 455/420 |
| 2020/0119807 A1 | 4/2020 | Whitefield et al. | |
| 2023/0066232 A1* | 3/2023 | Caro | H04B 7/18517 |
| 2023/0208508 A1 | 6/2023 | Hu et al. | |
| 2023/0308538 A1* | 9/2023 | Caro | G06F 3/048 |
| 2025/0085827 A1* | 3/2025 | Caro | G06F 3/016 |

* cited by examiner

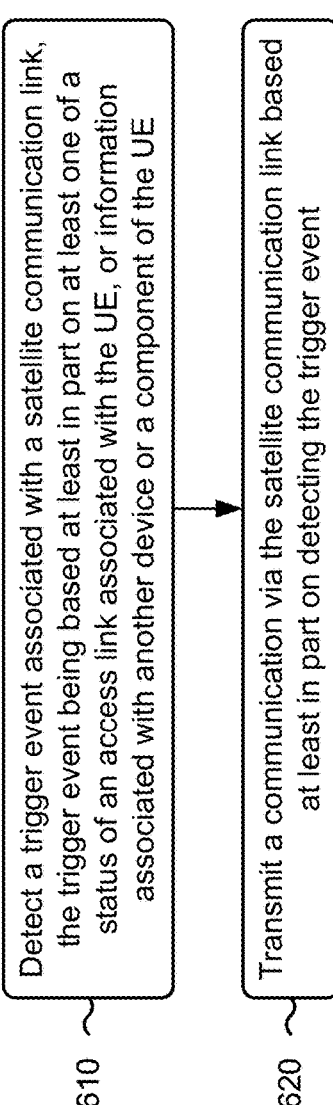

Detect a trigger event associated with a satellite communication link, the trigger event being based at least in part on at least one of a status of an access link associated with the UE, or information associated with another device or a component of the UE

610

Transmit a communication via the satellite communication link based at least in part on detecting the trigger event

EVENT TRIGGERED SATELLITE COMMUNICATIONS

CROSS-REFERENCE TO RELATED APPLICATION

This Patent application claims priority to U.S. Provisional Patent Application No. 63/381,213, filed on Oct. 27, 2022, entitled "EVENT TRIGGERED SATELLITE COMMUNI-CATIONS," and assigned to the assignee hereof. The dis-closure of the prior Application is considered part of and is incorporated by reference into this Patent Application.

FIELD OF THE DISCLOSURE

Aspects of the present disclosure generally relate to wireless communication and to techniques and apparatuses for event triggered satellite communications.

DESCRIPTION OF RELATED ART

Wireless communication systems are widely deployed to provide various telecommunication services such as tele-phony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division syn-chronous code division multiple access (TD-SCDMA) sys-tems, and Long Term Evolution (LTE). LTE/LTE-Advanced is a set of enhancements to the Universal Mobile Telecom-munications System (UMTS) mobile standard promulgated by the Third Generation Partnership Project (3GPP).

A wireless network may include one or more network nodes that support communication for wireless communi-cation devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device com-munication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broad-band internet access by improving spectral efficiency, low-ering costs, improving services, making use of new spec-trum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a user equipment (UE) for wireless communication. The UE may include one or more memories and one or more processors coupled to the one or more memories. The one or more processors may be individually or collectively configured to detect a trigger event associated with a satellite communication link, the trigger event being based at least in part on at least one of a status of an access link associated with the UE, or information associated with another device or a component of the UE. The one or more processors may be individually or collectively configured to transmit a communication via the satellite communication link based at least in part on detecting the trigger event.

Some aspects described herein relate to a method of wireless communication performed by a UE. The method may include detecting a trigger event associated with a satellite communication link, the trigger event being based at least in part on at least one of a status of an access link associated with the UE, or information associated with another device or a component of the UE. The method may include transmitting a communication via the satellite com-munication link based at least in part on detecting the trigger event.

Some aspects described herein relate to a non-transitory computer-readable medium that stores a set of instructions for wireless communication by a UE. The set of instructions, when executed by one or more processors of the UE, may cause the UE to detect a trigger event associated with a satellite communication link, the trigger event being based at least in part on at least one of a status of an access link associated with the UE, or information associated with another device or a component of the UE. The set of instructions, when executed by one or more processors of the UE, may cause the UE to transmit a communication via the satellite communication link based at least in part on detecting the trigger event.

Some aspects described herein relate to an apparatus for wireless communication. The apparatus may include means for detecting a trigger event associated with a satellite communication link, the trigger event being based at least in part on at least one of a status of an access link associated with the apparatus, or information associated with another device or a component of the apparatus. The apparatus may include means for transmitting a communication via the satellite communication link based at least in part on detect-ing the trigger event.

Aspects generally include a method, apparatus, system, computer program product, non-transitory computer-read-able medium, user equipment, base station, network entity, network node, wireless communication device, and/or pro-cessing system as substantially described herein with refer-ence to and as illustrated by the drawings and specification.

The foregoing has outlined rather broadly the features and technical advantages of examples according to the disclo-sure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a UE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
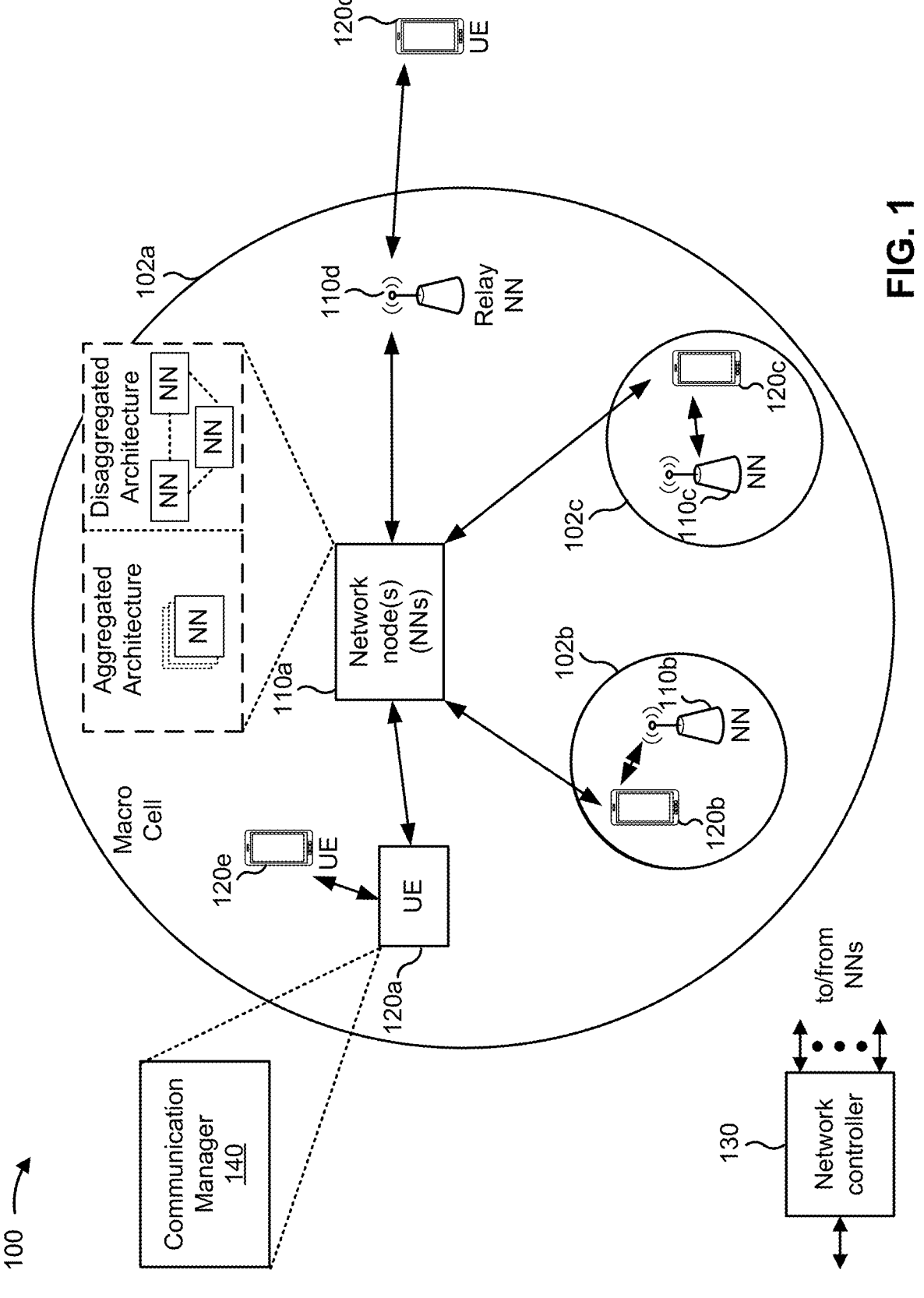
FIG. 1 is a diagram illustrating an example of a wireless network.

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing 284 that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may detect a trigger event associated with a satellite communication link, the trigger event being based at least in part on at least one of: a status of an access link associated with the UE 120, or information associated with another device or a component of the UE 120; and transmit a communication via the satellite communication link based at least in part on detecting the trigger event. Additionally, or alternatively, the communication manager 140 may perform one or more other operations described herein.

As indicated above, FIG. 1 is provided as an example. Other examples may differ from what is described with regard to FIG. 1.

Figure 2:
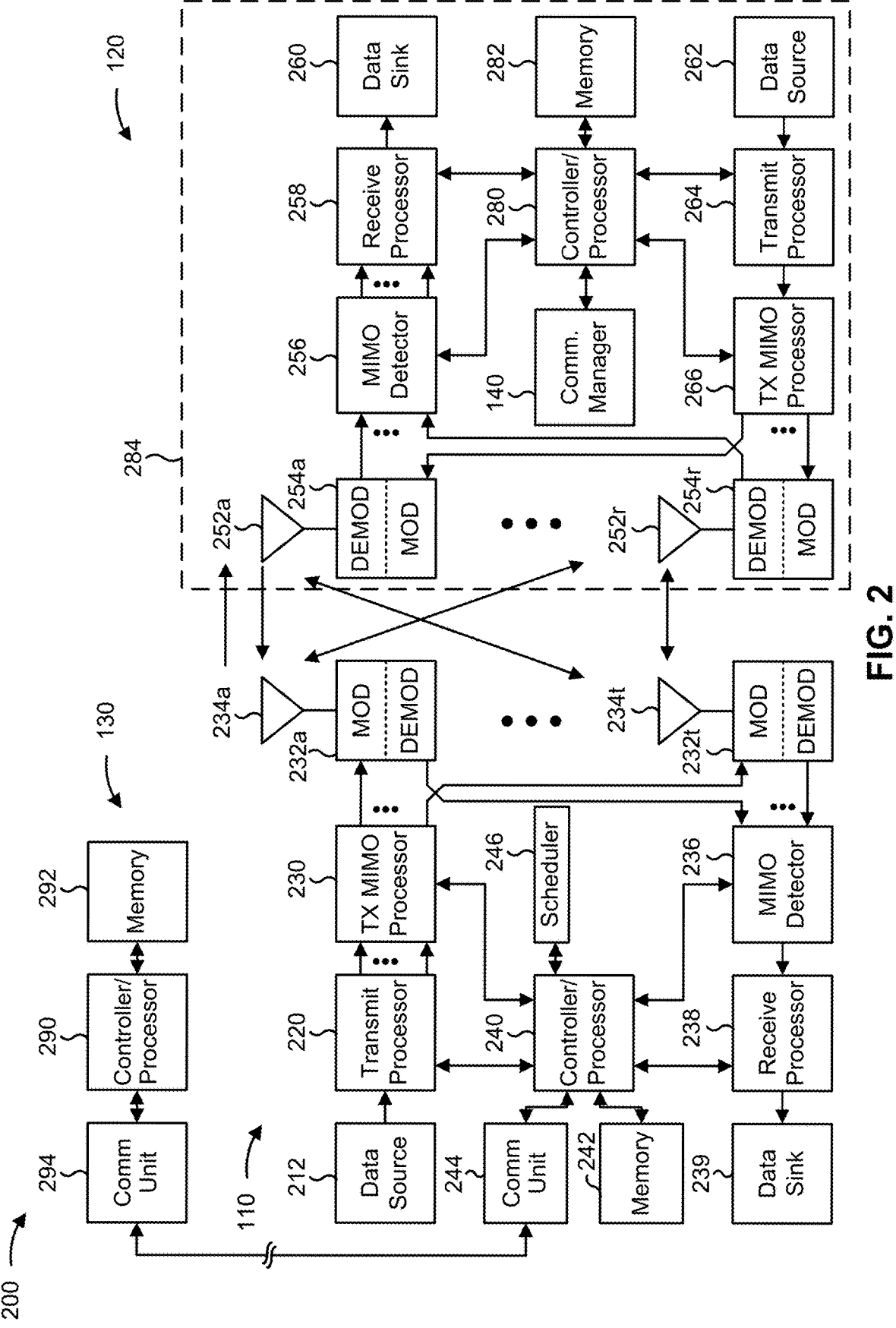
FIG. 2 is a diagram illustrating an example of a network node in communication with a user equipment (UE) in a wireless network.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCS s) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 5-7).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 5-7).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with event triggered satellite communications, as described in more detail elsewhere herein. For example, the controller/processor 240 of the network node 110, the controller/processor 280 of the UE 120, or any other component(s) (or combinations of components) of FIG. 2 may perform or direct operations of, for example, process 600 of FIG. 6, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 600 of FIG. 6, and/or other processes as described herein. In some examples, executing instructions may include running the instructions, converting the instructions, compiling the instructions, and/or interpreting the instructions, among other examples.

In some aspects, the UE 120 includes means for detecting a trigger event associated with a satellite communication link, the trigger event being based at least in part on at least one of: a status of an access link associated with the UE 120, or information associated with another device or a component of the UE 120; and/or means for transmitting a communication via the satellite communication link based at least in part on detecting the trigger event. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
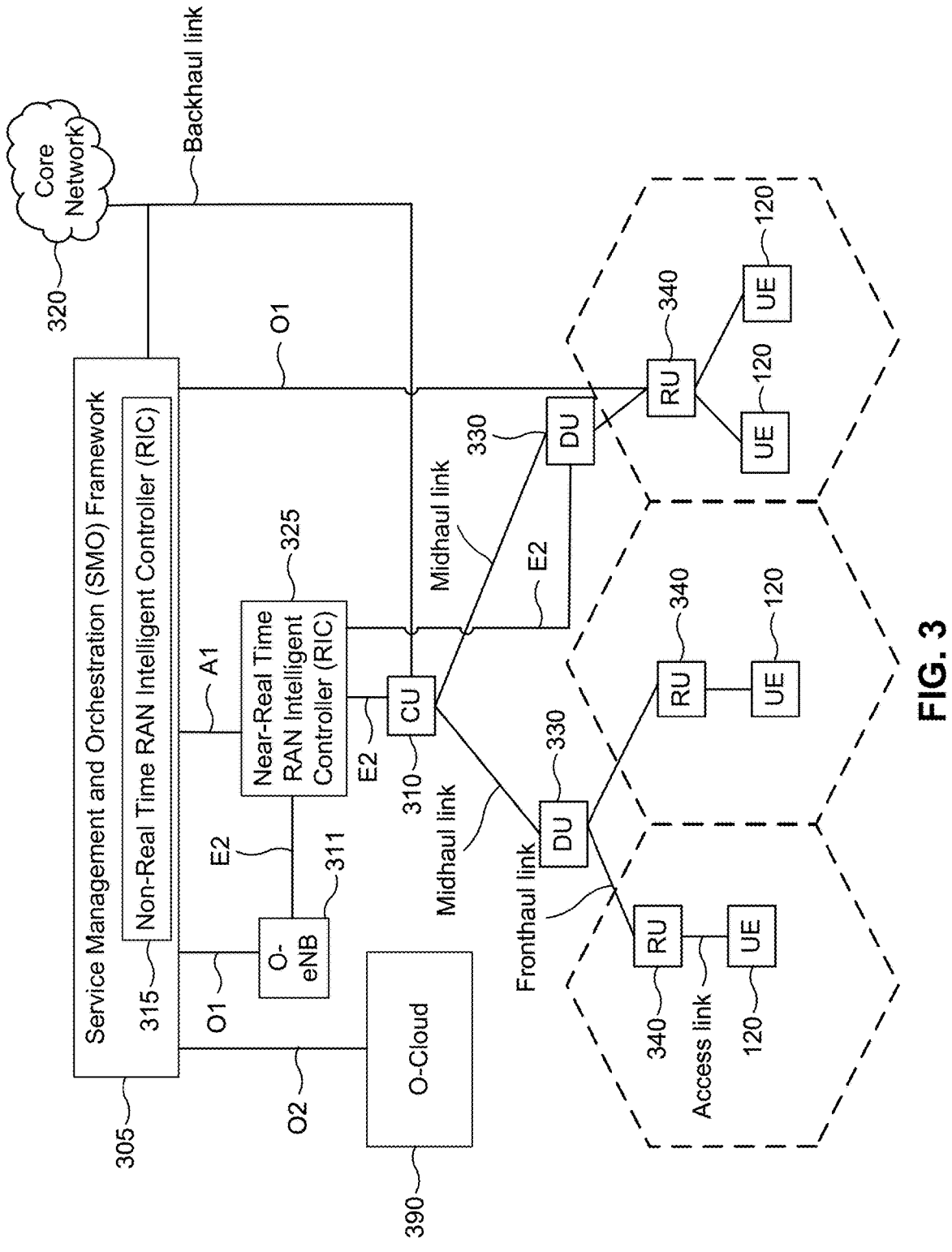
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
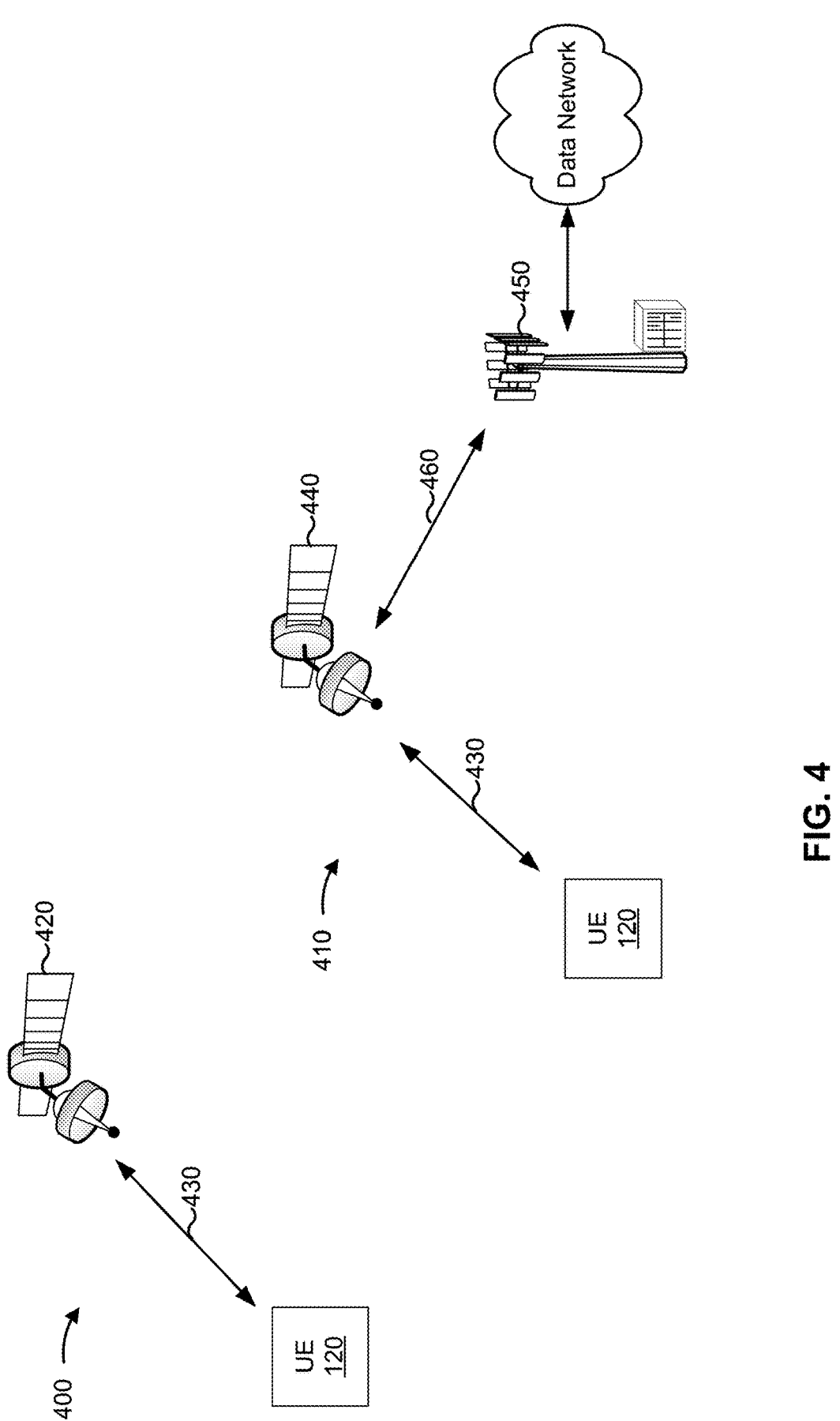
FIG. 4 is a diagram illustrating an example of a regenerative satellite deployment and an example of a transparent satellite deployment in a non-terrestrial network, in accordance with the present disclosure.

FIG. 4 is a diagram illustrating an example 400 of a regenerative satellite deployment and an example 410 of a transparent satellite deployment in a non-terrestrial network, in accordance with the present disclosure.

Example 400 shows a regenerative satellite deployment. In example 400, a UE 120 is served by a satellite 420 via a service link 430. For example, the satellite 420 may include a network node 110 (e.g., network node 110*a*) or a gNB. In some examples, the satellite 420 may be, or may be included in, an unmanned aerial system (UAS). In some aspects, the satellite 420 may be referred to as a non-terrestrial base station, a regenerative repeater, or an on-board processing repeater. In some aspects, the satellite 420 may demodulate an uplink radio frequency signal, and may modulate a baseband signal derived from the uplink radio signal to produce a downlink radio frequency transmission. The satellite 420 may transmit the downlink radio frequency signal on the service link 430. The satellite 420 may provide a cell that covers the UE 120.

Example 410 shows a transparent satellite deployment, which may also be referred to as a bent-pipe satellite deployment. In example 410, a UE 120 is served by a satellite 440 via the service link 430. The satellite 440 may be a transparent satellite. In some examples, the satellite 440 may be, or may be included in, a UAS. The satellite 440 may relay a signal received from a gateway 450 via a feeder link 460. The gateway 450 may communicate with a data network, such as a core network of a wireless communication network. For example, the satellite 440 may receive an uplink radio frequency transmission, and may transmit a downlink radio frequency transmission without demodulating the uplink radio frequency transmission. In some aspects, the satellite 440 may frequency convert the uplink radio frequency transmission received on the service link 430 to a frequency of the uplink radio frequency transmission on the feeder link 460, and may amplify and/or filter the uplink radio frequency transmission. In some aspects, the UEs 120 shown in example 400 and example 410 may be associated with a Global Navigation Satellite System (GNSS) capability or a Global Positioning System (GPS) capability, though not all UEs have such capabilities. The satellite 440 may provide a cell that covers the UE 120. In some examples, the satellite 420 and/or the satellite 440 may be a low Earth orbit (LEO) satellite, a medium Earth orbit (MEO) satellite, and/or a geostationary equatorial orbit (GEO) satellite, among other examples.

The service link 430 may include a link between the satellite 440 and the UE 120, and may include one or more of an uplink or a downlink. The feeder link 460 may include a link between the satellite 440 and the gateway 450, and may include one or more of an uplink (e.g., from the UE 120 to the gateway 450) or a downlink (e.g., from the gateway 450 to the UE 120). An uplink of the service link 430 may be indicated by reference number 430-U (not shown in FIG. 4) and a downlink of the service link 430 may be indicated by reference number 430-D (not shown in FIG. 4). Similarly, an uplink of the feeder link 460 may be indicated by reference number 460-U (not shown in FIG. 4) and a downlink of the feeder link 460 may be indicated by reference number 460-D (not shown in FIG. 4).

In some examples, communications via a satellite (such as the satellite 420 and/or the satellite 440) may be used by the UE 120 in connection with, or as an alternative to, an access link (e.g., a Uu link) with a network node 110 for ubiquitous connectivity. In some examples, a satellite communication network may include an inter-satellite link for communications between different satellites. In some examples, a satellite communication network may be based on technologies and/or protocols defined, or otherwise fixed, by a wireless communication standard, such as the 3GPP (e.g., a non-terrestrial network (NTN) as defined, or otherwise fixed, by the wireless communication standard). Additionally, or alternatively, a satellite communication network may be based on technologies and/or protocols defined, or otherwise fixed, by a private entity.

In some examples, a satellite communication network may support various wireless communication services. For example, the satellite communication network may support low data rate services, such as emergency call services (sometimes referred to as an "eCall" service) and/or other low data rate services. Additionally, or alternatively, the satellite communication network may support higher data rate services, such as mobile broadband services. The services provided by a satellite communication network may depend on a capability of satellites within the satellite communication network and/or capabilities of UEs served by the satellite communication network. Communications via a satellite communication network may be beneficial for a UE in scenarios where the UE has no or poor wireless communication coverage (e.g., has no, or a poor, connection with a network node 110). For example, some geographic areas may not be within a coverage area (e.g., a cell) of any network nodes 110. In such examples, a UE may be unable to communicate via a wireless communication network via a network node 110. Therefore, in such examples, it may be beneficial for the UE to communicate via a satellite to establish a connection with a data network and/or a core network of the wireless communication network. However, in some cases, a UE may establish a connection with a satellite (e.g., via a service link) only after receiving instructions or an input (e.g., a user input) indicating that the UE is to establish the connection via the service link with the satellite (e.g., the UE may only establish a connection with a satellite after receiving user input requesting that the UE establish the connection with the satellite). This may introduce a delay in establishing a connection via the satellite. Additionally, in some cases, this may result in the UE not establishing a connection with the satellite, such as in scenarios where a user is not able to provide an input to the UE (e.g., in emergency situations where the user may be unconscious or otherwise unable to provide an input to the UE).

Some techniques and apparatuses described herein enable event triggered satellite communications. For example, a UE may detect a trigger event associated with a satellite communication link (e.g., via a service link). The trigger event may be based at least in part on a status of an access link (e.g., a Uu link or a terrestrial network link) associated with the UE (e.g., if the status of the access link indicates that the access link is unavailable, then the satellite communication link may be used), and/or information associated with another device or a component of the UE (e.g., if the information indicates an event or incident configured to be associated with a trigger event, then the UE 120 may detect the trigger event), among other examples. The UE may transmit a communication via the satellite communication link based at least in part on detecting the trigger event (e.g., if the trigger event is detected, then the UE 120 may transmit the communication via the satellite communication link). As a result, a delay associated with the UE communicating via the satellite communication link may be reduced. Additionally, the event triggered satellite communication may enable the UE to establish a wireless communication connection via the satellite communication link without receiving instructions or input from a user. This may enable the UE to transmit the communication automatically after detecting the trigger event, thereby reducing latency and conserving processing resources that would have otherwise been used associated with obtaining and/or processing a user input requesting that the UE establish the satellite communication link. Further, the event triggered satellite communications described herein may enable the UE to transmit communications via a satellite communication link in scenarios in which a user may be unable to provide a user input and/or in which the user is unaware that the communication is to be transmitted, such as in emergency situations.

In some aspects, the UE may establish a communication connection associated with the satellite communication link based at least in part on detecting the trigger event. The communication connection may be used to transmit the communication via the satellite communication link (e.g., via a service link with a satellite). In some aspects, the UE may receive the information associated with the trigger event from a computing unit and/or a sensor (e.g., associated with the UE or a vehicle). For example, the UE may be, or may be included in, a component of a vehicle, such as an on-board unit (OBU) of the vehicle. The UE may receive the information from a computing unit (e.g., a central processing unit (CPU), a central control unit (CCU), and/or an electronic control unit (ECU)) associated with the vehicle. The information may indicate sensor data associated with the vehicle, an event that has occurred associated with the vehicle (e.g., a crash, an airbag deployment, or another event), and/or instructions to transmit a given type of communication (e.g., an emergency services call communication), among other examples. This may enable the UE to automatically transmit a communication based at least in part on information and/or events associated with a vehicle, thereby reducing a delay and/or conserving processing resources that would have otherwise been associated with obtaining and/or processing a user input to transmit the communication via the satellite communication link (e.g., such as in an emergency situation where the vehicle is associated with a crash and a user may be unable to provide a user input).

In some aspects, the communication may be a text communication or a short message service (SMS) communication. In some aspects, a format and/or content of the communication may be based at least in part on the trigger event that is detected by the UE. For example, the trigger event may indicate a given format and/or content to be associated with the communication. For example, the trigger event may indicate a severity of an event associated with a vehicle (e.g., a severity of a crash or malfunction of the vehicle). If the trigger event indicates a more severe event, then the communication may use a first format and/or content (e.g., that indicates a high importance and/or information associated with the event). If the trigger event indicates a less severe event, then the communication may use a first format and/or content (e.g., that indicates a lower importance and/or information associated with the event). In other words, the format and/or content of the communication may correspond to the trigger event that is detected by the UE. As a result, content of the communication may be tailored to the trigger event that is detected. For example, if the trigger event indicates a more severe event, then format of the communication may include additional fields to enable the communication to indicate additional information. If the trigger event indicates a less severe event, then the format of the communication may include less fields. Therefore, the communication may include more or less information (or different types of information) based on the trigger event that is detected. This may conserve processing resources and/or network resources that would have otherwise been used to transmit irrelevant or superfluous information in the communication. Additionally, this may ensure that all relevant information for a type of trigger event is included in the communication, thereby reducing a likelihood that additional communications associated with the trigger event are needed.

As indicated above, FIG. 4 is provided as an example. Other examples may differ from what is described with regard to FIG. 4.

Figure 5:
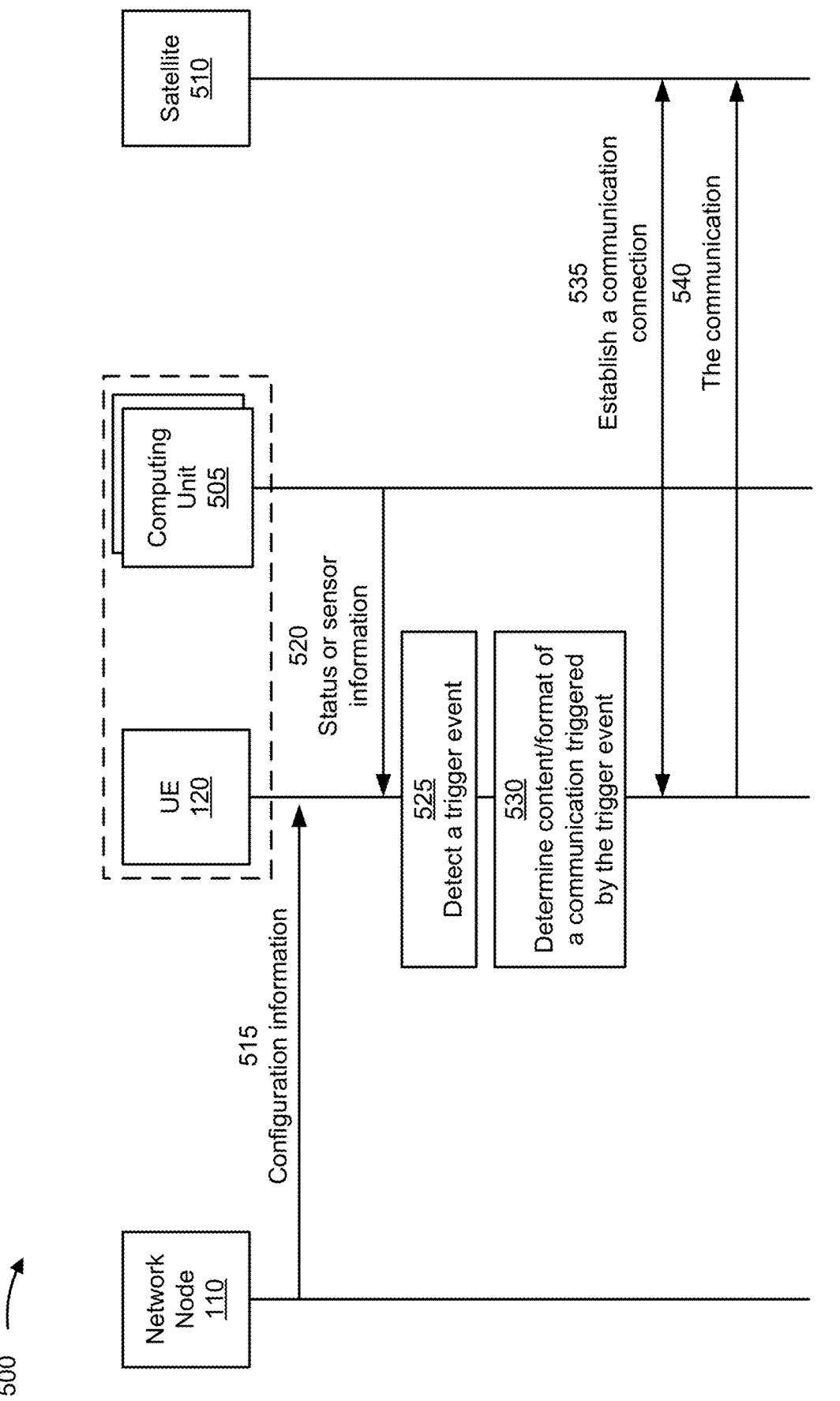
FIG. 5 is a diagram of an example associated with event triggered satellite communications, in accordance with the present disclosure.

FIG. 5 is a diagram of an example 500 associated with event triggered satellite communications, in accordance with the present disclosure. As shown in FIG. 5, a network node 110 (e.g., a base station, a CU, a DU, and/or an RU) may communicate with a UE 120. In some aspects, the network node and the UE 120 may be part of a wireless network (e.g., the wireless network 100). The UE 120 and the network node 110 may have established a wireless connection prior to operations shown in FIG. 5. For example, the UE 120 and the network node 110 may communicate via an access link (e.g., a Uu link). The network node 110 may be associated with a terrestrial network. As shown in FIG. 5, the UE 120 may be capable of communicating via a satellite 510. The satellite 510 may be associated with a satellite communication network in a similar manner as depicted and described in connection with FIG. 4.

The UE 120 may be associated with, or may communicate with, one or more computing units 505. A computing unit 505 may be a device capable of providing and/or processing data. For example, a computing unit 505 may be a CPU, a CCU, and/or an ECU associated with a vehicle. For example, the UE 120 may be included in the vehicle, such as in an OBU of the vehicle. In other examples, a computing unit 505 may be a computing unit of the UE 120. In other examples, a computing unit 505 may be a device that is separate from the UE 120 and that is configured to communicate with the UE 120. In some examples, a computing unit 505 may include a sensor, such as a gyroscope, an accelerometer, a speed sensor, a pressure sensor, a wheel speed sensor, an engine speed sensor, a voltage sensor, an engine oil sensor (e.g., an oil level sensor and/or an oil pressure sensor), a crash sensor (e.g., a supplemental restraint system (SRS) sensor or another sensor configured to detect a crash or collision associated with a vehicle), an airbag sensor, and/or another type of sensor configured to provide sensor data to the UE 120.

In some aspects, actions described herein as being performed by a network node 110 may be performed by multiple different network nodes. For example, configuration actions may be performed by a first network node (for example, a CU or a DU), and radio communication actions may be performed by a second network node (for example, a DU or an RU). As used herein, the network node 110 "transmitting" a communication to the UE 120 may refer to a direct transmission (for example, from the network node 110 to the UE 120) or an indirect transmission via one or more other network nodes or devices. For example, if the network node 110 is a DU, an indirect transmission to the UE 120 may include the DU transmitting a communication to an RU and the RU transmitting the communication to the UE 120. Similarly, the UE 120 "transmitting" a communication to the network node 110 may refer to a direct transmission (for example, from the UE 120 to the network node 110) or an indirect transmission via one or more other network nodes or devices. For example, if the network node 110 is a DU, an indirect transmission to the network node 110 may include the UE 120 transmitting a communication to an RU and the RU transmitting the communication to the DU.

In some aspects, as shown by reference number 515, the network node 110 may transmit, and the UE 120 may receive, configuration information. In some aspects, the UE 120 may receive the configuration information via one or more of RRC signaling, one or more MAC control elements (MAC-CEs), and/or downlink control information (DCI), among other examples. In some aspects, the configuration information may include an indication of one or more configuration parameters (e.g., stored by the UE 120 and/or previously indicated by the network node 110 or other network device) for selection by the UE 120, and/or explicit configuration information for the UE 120 to use to configure itself, among other examples. Additionally, or alternatively, the UE 120 may obtain the configuration information from a memory of the UE 120. For example, the configuration information may be included in an original equipment manufacturer (OEM) configuration. In such examples, the configuration information may be defined, or otherwise fixed, by a wireless communication standard, such as the 3GPP.

In some aspects, the configuration information may indicate that the UE 120 is to transmit a communication to the satellite 510 based at least in part on detecting a trigger event. In some aspects, the configuration information may indicate one or more trigger events. For example, a trigger event may include obtaining information from a computing unit 505 that indicates that the UE 120 is to transmit a communication to the satellite 510. For example, the information may include an indication from a computing unit 505 that indicates that the trigger event has occurred (e.g., an indication that a crash, collision, and/or other event associated with the vehicle has occurred). As another example, the information may include sensor data that indicates that a crash, collision, and/or other event associated with the vehicle has occurred. For example, a trigger event may be associated with one or more measurement values indicated by sensor data satisfying a threshold. As another example, the information may indicate an event associated with the vehicle, such as an airbag deployment, a collision or crash, a rapid deceleration, a rollover of the vehicle, and/or a maintenance event (e.g., associated with an oil level, a tire pressure, a mileage of the vehicle, a filter, or another maintenance item), among other examples.

In some aspects, the configuration information may indicate that a trigger event is based at least in part on a status of an access link associated with the UE 120 (e.g., an access link with the network node 110). For example, a trigger event may include an indication that an access link or terrestrial link (e.g., with the network node 110) is unavailable and/or has poor quality (e.g., is associated with a measurement value (such as RSRP, RSRQ, and/or RSSI) that does not satisfy a threshold). For example, a trigger event may indicate that the communication is to be transmitted to the satellite 510 if the access link with the network node 110 is unavailable and/or has poor quality. For example, the UE 120 may use the satellite 510 for all communications triggered by a trigger event (e.g., as described elsewhere herein) if a measurement value associated with the access link does not satisfy a measurement threshold. As another example, the UE 120 may use the satellite 510 for communications triggered by a trigger event (e.g., as described elsewhere herein) associated with certain formats (e.g., associated with formats used to indicate an emergency event) if the access link with the network node 110 is unavailable and/or has poor quality. As another example, the UE 120 may use the satellite 510 for communications triggered by a trigger event (e.g., as described elsewhere herein) that are associated with a priority value that satisfies a priority threshold. In some other aspects, the UE 120 may not consider information associated with the status of the access link when detecting the trigger event.

In some aspects, the configuration information may indicate a format and/or content of the communication to be transmitted to the satellite 510 if a trigger event is detected. For example, the configuration information may indicate one or more communication formats. In some aspects, the configuration information may indicate a single communication format (e.g., a standardized format) that includes one or more fields. For example, the one or more fields may include a location field (e.g., for indicating a location of the UE or the vehicle via geographic coordinates and/or road locations), a vehicle information field (e.g., for indicating vehicle information, such as a model, year, make type, license plate number, and/or vehicle identification number (VIN)), a user information field (e.g., for indicating information associated with a driver or owner of the vehicle, such as a name, age, height, weight, and/or information indicated by a driver's license of the user), among other examples. In some aspects, the one or more fields may include one or more fields for indicating information associated with the trigger event that is detected, such as a field for indicating that a crash or collision is detected, a type or severity of the crash or collision (e.g., head-on, rear-end, side impact, rollover, and/or a vehicle speed prior to the crash or collision), and/or that a maintenance event has occurred (e.g., a flat tire, an engine malfunction, or another maintenance event), among other examples.

In some other aspects, the configuration information may indicate multiple communication formats. Each communication format, from the multiple communication formats, may be configured with fields for indicating information associated with a particular type of trigger event. For example, the configuration information may indicate that the UE 120 is to use a communication format, from the multiple communication formats, that is associated with a trigger event that is detected by the UE 120. In some aspects, each communication format, from the multiple communication formats, may be associated with the same recipient (e.g., an application server and/or a device associated with emergency services). In other examples, the multiple communication formats may be associated with different recipients. For example, a first communication format may be associated with an emergency services recipient (e.g., for a trigger event associated with a crash or collision of the vehicle). A second communication format may be associated with a maintenance provider (e.g., a service center) recipient (e.g., for a trigger event associated with a maintenance event or other vehicle issue).

The UE 120 may configure itself based at least in part on the configuration information. In some aspects, the UE 120 may be configured to perform one or more operations described herein based at least in part on the configuration information.

As shown by reference number 520, the UE 120 may receive, from one or more computing units 505, information associated with another device (e.g., the vehicle) and/or a component of the UE 120. The component of the UE 120 may be a sensor associated with, or included in, the UE 120 and/or an RF component of the UE 120, among other examples. For example, the information may include status information associated with the UE 120 and/or the vehicle associated with the UE 120. The status information may indicate a status or event associated with the UE 120 and/or the vehicle. For example, the status information may indicate that a crash or collision associated with the vehicle has occurred. As another example, the status information may indicate that one or more airbags of the vehicle have deployed. For example, a computing unit 505 may collect sensor information and determine the status information associated with the UE 120 and/or the vehicle.

As another example, the status information may indicate that an event associated with a user of the UE 120 has occurred. For example, a computing unit 505 may detect a fall (e.g., may detect that the user has fallen down). Additionally, the computing unit 505 may detect a health event or incident associated with the user (e.g., may detect that a heart rate of the user is less than a heart rate threshold).

In some aspects, a computing unit 505 may determine that a trigger event has occurred (e.g., based at least in part on the collected sensor information) and may provide an indication to the UE 120 that the trigger event has occurred. For example, a CPU or CCU of the vehicle may determine that the trigger event has occurred and may provide an indication to the UE 120 (e.g., to an OBU of the vehicle) that the trigger event has occurred. For example, a CPU or CCU of the vehicle may obtain sensor data and/or information from one or more ECUs of the vehicle. The CPU or the CCU may determine that a trigger event has occurred based at least in part on the sensor data and/or the information from the one or more ECUs. For example, the CPU or the CCU may determine that a crash or collision associated with the vehicle has occurred based on obtaining information that indicates a rapid deceleration of the vehicle and/or a sensor (e.g., a crash sensor or a pressure sensor) indicating a collision, among other examples. As another example, an ECU may indicate, to the CPU or the CCU, that an event has occurred, such as an airbag deployment. The CPU or the CCU may determine that the trigger event has occurred based at least in part on the ECU indicating that the event has occurred (e.g., the event may indicate a trigger event associated with the UE 120 transmitting a communication to the satellite 510).

As another example, an ECU of a system or component of the vehicle may determine that the trigger event has occurred. The ECU may provide an indication to the UE 120

(e.g., to an OBU of the vehicle) that the trigger event has occurred. For example, an ECU associated with an airbag control unit may receive sensor data indicating that a crash or collision has occurred. The ECU may activate one or more safety features of the vehicle (e.g., seat belt lock, automatic door lock, and/or airbag deployment) based on the sensor data indicating that a crash or collision has occurred. Additionally, the ECU may provide an indication to the UE 120 (e.g., to the OBU) indicating that the UE 120 is to transmit a communication to the satellite 510 (e.g., based on the ECU determining that the sensor data indicating that a crash or collision has occurred). For example, the UE 120 (e.g., the OBU) may communicate directly with the ECU and/or via a vehicle controller area network (CAN) bus, among other examples. For example, the UE 120 may receive the information (e.g., status information and/or sensor data) via a CAN communication.

In some aspects, the UE 120 may obtain, from a computing unit 505, sensor data. The sensor data may be associated with the vehicle, a device (such as a device being worn by a user of the UE 120), and/or the UE 120, among other examples. For example, the sensor data may include crash sensor data (e.g., from an accelerometer, gyroscope, pressure sensor, or another sensor), fluid level sensor data, fluid pressure sensor data, another health sensor data (e.g., heart rate data, blood oxygen level data, and/or fall detection sensor data), among other examples. The UE 120 may analyze the sensor data. For example, the UE 120 may determine whether values indicated by the sensor data satisfy one or more thresholds (e.g., one or more thresholds associated with trigger event(s) described herein).

As shown by reference number 525, the UE 120 may detect a trigger event. For example, the UE 120 may detect the trigger event based at least in part on information and/or a communication obtained from one or more computing units 505. For example, in some cases, a computing unit 505 may indicate, to the UE 120, that the trigger event has occurred. For example, a CPU, CCU, and/or ECU of the vehicle may indicate, to the UE 120, that the trigger event has occurred. As another example, a device being worn by a user of the UE 120 may transmit, and the UE 120 may receive, an indication that a trigger event has occurred (e.g., based at least in part on sensor data obtained by the device indicating that the trigger event has occurred).

In some aspects, the UE 120 may detect the trigger event based at least in part on analyzing sensor data obtained by the UE 120. For example, the UE 120 may receive sensor data from one or more sensors (e.g., from one or more computing units 505). The UE 120 may determine whether one or more values indicated by the sensor data satisfy a threshold. For example, the sensor data may indicate acceleration data associated with a vehicle. The UE 120 may determine whether a value indicated by the acceleration data satisfies an acceleration threshold (e.g., where the acceleration threshold is associated with a rapid deceleration indicating a crash or collision). As another example, the sensor data may indicate an oil level associated with the vehicle. The 120 may determine whether the oil level satisfies an oil level threshold (e.g., where the oil level threshold indicates that the oil needs to be replaced or refilled). As another example, the sensor data may indicate a running status of an engine of the vehicle. The UE 120 may determine whether the running status of the engine indicates that a maintenance event associated with the engine has occurred. The UE 120 may detect the trigger event based on detecting that the maintenance event associated with the engine has occurred.

In some aspects, the UE 120 may detect the trigger event based at least in part on an explicit indication from a computing unit 505 that the trigger event has occurred. In other words, the UE 120 may receive, from a computing unit 505 (such as a CPU, CCU, and/or ECU), an indication that the trigger event has occurred. In other examples, the UE 120 may receive, from a computing unit 505, an indication of an event that has occurred. For example, the event may include an airbag deployment, a force or severity of a collision, a heart rate drop of a user, an amount of time from a last maintenance event (e.g., an amount of time from a last oil change associated with the vehicle), among other examples. The UE 120 may detect that trigger event based on the indication of the event. For example, the UE 120 may determine whether the event is associated with a type or severity level that is configured to trigger a communication to the satellite 510. For example, the event may indicate that a collision has occurred that has a severity level that satisfies a severity threshold (e.g., a force of the collision may satisfy a force threshold). The UE 120 may detect the trigger event based at least in part on determining that the severity level satisfies the severity threshold.

In some aspects, the UE 120 may detect the trigger event that triggers the UE 120 to transmit the communication via the satellite link based at least in part on a status of the access link with the network node 110. For example, the UE 120 may detect an event in a similar manner as described above. Additionally, the UE 120 may detect that the status of the access link indicates that the access link is unavailable (e.g., that there is no connection or that a measurement value of the access link is less than a link threshold). In other words, the UE 120 may detect the trigger event based on detecting that the communication is to be transmitted via the satellite link because the access link is unavailable and/or is associated with poor quality.

As shown by reference number 530, the UE 120 may determine a content and/or format of a communication that is triggered by the triggering event. In some aspects, the UE 120 may receive, from a computing unit 505, an indication of the content and/or format of the communication. For example, the UE 120 may receive (e.g., as described above in connection with reference number 520) an indication that the communication is to be transmitted via a satellite communication link (e.g., to the satellite 510). The indication that the communication is to be transmitted may indicate the content and/or format of the communication. In another example, the UE 120 may obtain an indication of the content and/or format of the communication from a memory of the UE 120. For example, the content and/or format of the communication may be stored by the UE 120 (e.g., the content and/or format may be a standard format that is pre-programmed, such as via the configuration information).

In some aspects, the UE 120 may determine the content and/or format of the communication based on the trigger event that is detected. For example, a given trigger event may be associated with a given content and/or format. The UE 120 may detect the trigger event and may determine the content and/or format of the communication based at least in part on a type or category of the trigger event. For example, if the trigger event is associated with a crash or collision of the vehicle, then the UE 120 may use a first format for the communication. If the trigger event is associated with a maintenance event of the vehicle, then the UE 120 may use a second format for the communication. If the trigger event is associated with a health event of a user, then the UE 120 may use a third format for the communication.

In some aspects, the communication may indicate a geographic location of the UE 120 and/or the vehicle, vehicle information of the vehicle associated with the UE 120 (e.g., a make of the vehicle, a model of the vehicle, a year of the vehicle, a color of the vehicle, a VIN of the vehicle, and/or a license plate number of the vehicle), user information of a user associated with the UE 120 (e.g., a name, age, gender, height, weight, and/or race), and/or incident information associated with the trigger event (e.g., indicating a type of trigger event, a severity of the trigger event, and/or information describing the trigger event), among other examples. In some aspects, the UE 120 may be configured with a single format for the communication. The UE 120 may include information in the communication using fields configured for the single format. In other aspects, the UE 120 may be configured with multiple formats. The UE 120 may use a format, from the multiple formats, that is based at least in part on a type of the trigger event that is detected (e.g., as described in more detail elsewhere herein).

In some aspects, the UE 120 may select a communication link (e.g., from an access link with the network node 110 and a service link with the satellite 510) to be used to transmit the communication. For example, detecting the trigger event may trigger the UE 120 to transmit the communication. In some aspects, the UE 120 may select the service link with the satellite 510 regardless of a status of the access link with the network node 110. For example, the satellite communication link (e.g., the service link) with the satellite 510 may be used by the UE 120 to transmit the communication based at least in part on the satellite communication link being used for communications that are triggered via the trigger event. In other words, if the UE 120 is capable of communicating via a satellite communication link and the satellite communication link is available, then the UE 120 may always use the satellite communication link to transmit the communication. In some aspects, in addition to transmitting the communication via the satellite link, the UE 120 may transmit the communication (e.g., another communication that includes the same or similar content) via the access link (e.g., the Uu link) with the network node 110. This may increase a reliability of the communication.

In some aspects, a link to be used to transmit the communication may be based at least in part on a status of access link with the network node 110. For example, the UE 120 may prioritize the use of the access link with the network node 110 over the use of the satellite communication link. For example, the UE 120 may select the satellite communication link based at least in part on the status of the access link indicating that the access link is unavailable (e.g., that there is no connection or that a measurement value of the access link is less than a link threshold). In other words, the UE 120 may select the access link to be used to transmit the communication unless the status of the access link indicates that the access link is unavailable (e.g., in which case the UE 120 may select the satellite communication link).

As shown by reference number 535, the UE 120 and the satellite 510 may establish a communication connection associated with the satellite communication link based at least in part on detecting the trigger event. For example, the UE 120 and the satellite 510 may establish the communication connection based at least in part on the UE 120 selecting the satellite communication link to be used for transmitting the communication. For example, the UE 120 may establish a communication session with the satellite 510 based at least in part on detecting the trigger event (e.g., if the trigger event is detected and/or the satellite communication link is selected, then the UE 120 may establish the communication session with the satellite 510). In other aspects, the UE 120 and the network node 110 may establish a communication connection associated with the access link based at least in part on detecting the trigger event (e.g., based at least in part on the UE 120 selecting the access link to be used for transmitting the communication).

As shown by reference number 540, the UE 120 may transmit, and the satellite 510 may receive, the communication. For example, the UE 120 may transmit the communication via the satellite communication link based at least in part on detecting the trigger event (e.g., if the trigger event is detected and/or the satellite communication link is selected, then the UE 120 may transmit the communication session to the satellite 510). The UE 120 may transmit the communication using a format that is selected by the UE 120 as described in more detail elsewhere herein.

In some aspects, the communication may be associated with a recipient. In some aspects, the recipient may be associated with the format used for the communication. In some aspects, the recipient may be an application server. For example, the application server may receive the communication and may contact an entity based at least in part on content of the communication. For example, if the communication is an emergency SMS communication, then the application server may contact emergency services and may provide information indicated by the communication. As another example, if the communication indicates a maintenance event associated with the vehicle, then the application server may contact a service provider to schedule an appointment or to cause the service provider to contact a user of the vehicle to schedule the appointment. In some aspects, the recipient may be a device associated with an emergency service. For example, the emergency service may be an entity that handles emergency calls (e.g., an entity associated with an emergency telephone number, such as 911 in the United States). As another example, the recipient may be associated with an emergency contact number. For example, the UE 120 may be configured with one or more emergency contact numbers (e.g., phone numbers). The UE 120 may transmit the communication to the one or more emergency contact numbers via the satellite 510.

In some aspects, the communication session with the satellite 510 may be a two-way communication session (e.g., in which a response to the communication is transmitted to the UE 120 via the satellite 510). In other words, transmitting the communication may cause a two-way communication session to be initiated. In some aspects, the two-way communication session to be initiated for certain types of trigger events (e.g., health incidents of a user or collision associated with a vehicle) and may not be initiated for other types of trigger events (e.g., maintenance events associated with the vehicle). For example, the two-way communication session may be a data session. For example, the recipient of the communication may transmit, and the UE 120 may receive (e.g., via the satellite 510), a request for additional data associated with the trigger event. In some aspects, the UE 120 may obtain (e.g., from the one or more computing units 505) the additional data. The UE 120 may transmit (e.g., via the satellite 510) the additional data to the recipient. In some aspects, the two-way communication session may be a voice session. For example, the UE 120 may receive (e.g., via the satellite 510) a voice call from the recipient based at least in part on transmitting the communication.

As a result, a delay associated with the UE 120 communicating via the satellite communication link may be reduced. Additionally, the event triggered satellite communication may enable the UE 120 to establish a wireless communication connection via the satellite communication link without receiving instructions or input from a user. This may enable the UE 120 to transmit the communication automatically after detecting the trigger event, thereby reducing latency and conserving processing resources that would have otherwise been used associated with obtaining and/or processing a user input requesting that the UE 120 establish the satellite communication link. Further, the event triggered satellite communications described herein may enable the UE 120 to transmit communications via a satellite communication link in scenarios in which a user may be unable to provide a user input and/or in which the user is unaware that the communication is to be transmitted, such as in emergency situations As indicated above, FIG. 5 is provided as an example. Other examples may differ from what is described with respect to FIG. 5.

FIG. 6 is a diagram illustrating an example process 600 performed, for example, by a UE, in accordance with the present disclosure. Example process 600 is an example where the UE (e.g., the UE 120) performs operations associated with event triggered satellite communications.

As shown in FIG. 6, in some aspects, process 600 may include detecting a trigger event associated with a satellite communication link, the trigger event being based at least in part on at least one of: a status of an access link associated with the UE, or information associated with another device or a component of the UE (block 610). For example, the UE (e.g., using communication manager 140 and/or detection component 708, depicted in FIG. 7) may detect a trigger event associated with a satellite communication link, the trigger event being based at least in part on at least one of: a status of an access link associated with the UE, or information associated with another device or a component of the UE, as described above.

As further shown in FIG. 6, in some aspects, process 600 may include transmitting a communication via the satellite communication link based at least in part on detecting the trigger event (block 620). For example, the UE (e.g., using communication manager 140 and/or transmission component 704, depicted in FIG. 7) may transmit a communication via the satellite communication link based at least in part on detecting the trigger event, as described above.

Process 600 may include additional aspects, such as any single aspect or any combination of aspects described below and/or in connection with one or more other processes described elsewhere herein.

In a first aspect, process 600 includes establishing a communication connection associated with the satellite communication link based at least in part on detecting the trigger event.

In a second aspect, alone or in combination with the first aspect, process 600 includes receiving, from the other device or the component, the information, where the information indicates that the UE is to transmit the communication.

In a third aspect, alone or in combination with one or more of the first and second aspects, the information indicates at least one of a format or a content of the communication.

In a fourth aspect, alone or in combination with one or more of the first through third aspects, the UE is associated with a vehicle, and process 600 includes receiving the information from a computing unit associated with the vehicle via a CAN communication.

In a fifth aspect, alone or in combination with one or more of the first through fourth aspects, the computing unit is a CPU, a CCU, or an ECU.

In a sixth aspect, alone or in combination with one or more of the first through fifth aspects, the information includes sensor data, and detecting the trigger event includes detecting the trigger event based at least in part on analyzing the sensor data.

In a seventh aspect, alone or in combination with one or more of the first through sixth aspects, the information indicates status information associated with the UE or a vehicle associated with the UE, and detecting the trigger event includes detecting the trigger event based at least in part on the status information.

In an eighth aspect, alone or in combination with one or more of the first through seventh aspects, transmitting the communication via the satellite communication link is based at least in part on the satellite communication link being used for communications that are triggered via the trigger event.

In a ninth aspect, alone or in combination with one or more of the first through eighth aspects, detecting the trigger event includes detecting the trigger event based at least in part on the status of the access link indicating that the access link is unavailable.

In a tenth aspect, alone or in combination with one or more of the first through ninth aspects, the communication indicates at least one of a geographic location of the UE, information of a vehicle associated with the UE, user information of a user associated with the UE, or information associated with the trigger event.

In an eleventh aspect, alone or in combination with one or more of the first through tenth aspects, communications that are triggered via trigger events are associated with multiple formats, and transmitting the communication includes transmitting the communication using a format, from the multiple formats, that is based at least in part on a type of the trigger event that is detected.

In a twelfth aspect, alone or in combination with one or more of the first through eleventh aspects, transmitting the communication causes a two-way communication session to be initiated.

In a thirteenth aspect, alone or in combination with one or more of the first through twelfth aspects, the two-way communication session is a data session or a voice session.

In a fourteenth aspect, alone or in combination with one or more of the first through thirteenth aspects, the UE is associated with an OBU of a vehicle.

In a fifteenth aspect, alone or in combination with one or more of the first through fourteenth aspects, the communication includes an SMS communication.

In a sixteenth aspect, alone or in combination with one or more of the first through fifteenth aspects, the communication is an emergency service communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
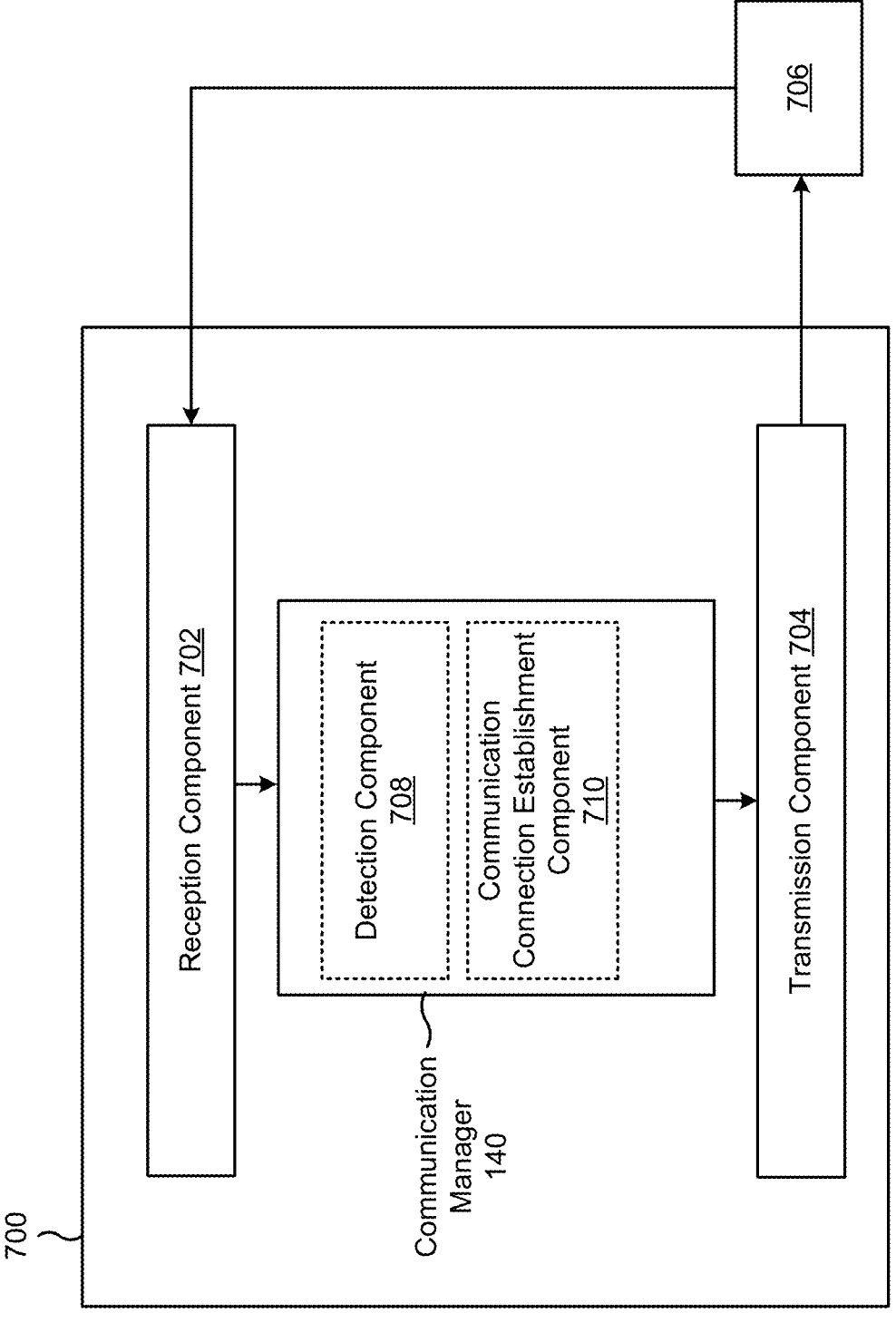
FIG. 7 is a diagram of an example apparatus for wireless communication, in accordance with the present disclosure.

FIG. 7 is a diagram of an example apparatus 700 for wireless communication, in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a detection component 708, and/or a communication connection establishment component 710, among other examples.

In some aspects, the apparatus 700 may be configured to perform one or more operations described herein in connection with FIG. 5. Additionally, or alternatively, the apparatus 700 may be configured to perform one or more processes described herein, such as process 600 of FIG. 6, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The detection component 708 may detect a trigger event associated with a satellite communication link, the trigger event being based at least in part on at least one of a status of an access link associated with the UE, or information associated with another device or a component of the UE. The transmission component 704 may transmit a communication via the satellite communication link based at least in part on detecting the trigger event.

The communication connection establishment component 710 may establish a communication connection associated with the satellite communication link based at least in part on detecting the trigger event.

The reception component 702 may receive, from the other device or the component, the information, wherein the information indicates that the UE is to transmit the communication.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: detecting a trigger event associated with a satellite communication link, the trigger event being based at least in part on at least one of: a status of an access link associated with the UE, or information associated with another device or a component of the UE; and transmitting a communication via the satellite communication link based at least in part on detecting the trigger event.

Aspect 2: The method of Aspect 1, further comprising: establishing a communication connection associated with the satellite communication link based at least in part on detecting the trigger event.

Aspect 3: The method of any of Aspects 1-2, further comprising: receiving, from the other device or the component, the information, wherein the information indicates that the UE is to transmit the communication.

Aspect 4: The method of any of Aspects 1-3, wherein the information indicates at least one of a format or a content of the communication.

Aspect 5: The method of any of Aspects 1-4, wherein the UE is associated with a vehicle, the method further comprising: receiving the information from a computing unit associated with the vehicle via a controller area network (CAN) communication.

Aspect 6: The method of Aspect 5, wherein the computing unit is a central processing unit (CPU), a central control unit (CCU), or an electronic control unit (ECU).

Aspect 7: The method of any of Aspects 1-6, wherein the information includes sensor data, and wherein detecting the trigger event comprises: detecting the trigger event based at least in part on analyzing the sensor data.

Aspect 8: The method of any of Aspects 1-7, wherein the information indicates status information associated with the UE or a vehicle associated with the UE, and wherein detecting the trigger event comprises: detecting the trigger event based at least in part on the status information.

Aspect 9: The method of any of Aspects 1-8, wherein transmitting the communication via the satellite communication link is based at least in part on the satellite communication link being used for communications that are triggered via the trigger event.

Aspect 10: The method of any of Aspects 1-9, wherein detecting the trigger event comprises: detecting the trigger event based at least in part on the status of the access link indicating that the access link is unavailable.

Aspect 11: The method of any of Aspects 1-10, wherein the communication indicates at least one of: a geographic location of the UE, vehicle information of a vehicle associated with the UE, user information of a user associated with the UE, or incident information associated with the trigger event.

Aspect 12: The method of any of Aspects 1-11, wherein communications that are triggered via trigger events are associated with multiple formats, and where transmitting the communication comprises: transmitting the communication using a format, from the multiple formats, that is based at least in part on a type of the trigger event that is detected.

Aspect 13: The method of any of Aspects 1-12, wherein transmitting the communication causes a two-way communication session to be initiated.

Aspect 14: The method of Aspect 13, wherein the two-way communication session is a data session or a voice session.

Aspect 15: The method of any of Aspects 1-14, wherein the UE is associated with an on-board unit (OBU) of a vehicle.

Aspect 16: The method of any of Aspects 1-15, wherein the communication includes a short message service (SMS) communication.

Aspect 17: The method of any of Aspects 1-16, wherein the communication is an emergency service communication.

Aspect 18: An apparatus for wireless communication at a device, comprising a processor; memory coupled with the processor; and instructions stored in the memory and executable by the processor to cause the apparatus to perform the method of one or more of Aspects 1-17.

Aspect 19: A device for wireless communication, comprising a memory and one or more processors coupled to the memory, the one or more processors configured to perform the method of one or more of Aspects 1-17.

Aspect 20: An apparatus for wireless communication, comprising at least one means for performing the method of one or more of Aspects 1-17.

Aspect 21: A non-transitory computer-readable medium storing code for wireless communication, the code comprising instructions executable by a processor to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. An on-board unit (OBU) of a vehicle, comprising:
one or more memories; and
one or more processors coupled to the one or more memories, the one or more processors individually or collectively configured to:
receive status or sensor information from another component of the vehicle;
detect a trigger event associated with a satellite communication link, the trigger event being based at least in part on the status or sensor information;
determine a format of a communication based at least in part on a type or category of the trigger event; and
automatically transmit the communication using the format via the satellite communication link based at least in part on the trigger event.

2. The OBU of claim 1, wherein the one or more processors are further individually or collectively configured to:
establish a communication connection associated with the satellite communication link based at least in part on the trigger event and without instructions or input from a user.

3. The OBU of claim 1, wherein the one or more processors are further individually or collectively configured to:
receive, from another device or the other component, information indicating that the OBU is to transmit the communication.

4. The OBU of claim 3, wherein the information indicates at least one of the format or a content of the communication.

5. The OBU of claim 1, wherein the one or more processors, to receive the status or sensor information, are individually or collectively configured to:
receive the status or sensor information via a controller area network (CAN) communication.

6. The OBU of claim 1, wherein the other component is a central processing unit (CPU), a central control unit (CCU), or an electronic control unit (ECU).

7. The OBU of claim 1, wherein the one or more processors, to detect the trigger event, are individually or collectively configured to:
detect the trigger event based at least in part on analyzing the status or sensor information.

8. The OBU of claim 1, wherein the status or sensor information indicates a status associated with the OBU or the vehicle.

9. The OBU of claim 1, wherein the one or more processors, to automatically transmit the communication via the satellite communication link, are individually or collectively configured to automatically transmit the communication via the satellite communication link based at least in part on the satellite communication link being used for communications that are triggered via the trigger event.

10. The OBU of claim 1, wherein the one or more processors, to detect the trigger event, are individually or collectively configured to:
detect the trigger event based at least in part on a status of an access link indicating that the access link is unavailable.

11. The OBU of claim 1, wherein the communication includes a short message service (SMS) communication.

12. The OBU of claim 1, wherein the communication is an emergency service communication.

13. The OBU of claim 1, wherein the communication indicates at least one of:
a geographic location of the OBU,
vehicle information of the vehicle,
user information associated with the OBU, or
incident information associated with the trigger event.

14. A method of wireless communication performed by an on-board unit (OBU) of a vehicle, comprising:
receiving status or sensor information from another component of the vehicle;
detecting a trigger event associated with a satellite communication link, the trigger event being based at least in part on the status or sensor information;
determining a format of a communication based at least in part on a type or category of the trigger event; and
automatically transmitting the communication using the format via the satellite communication link based at least in part on detecting the trigger event.

15. The method of claim 14, further comprising:
establishing a communication connection associated with the satellite communication link based at least in part on detecting the trigger event and without instructions or input from a user.

16. The method of claim 14, further comprising:
receiving, from another device or the other component, information indicating that the OBU is to transmit the communication.

17. The method of claim 16, wherein the information indicates at least one of the format or a content of the communication.

18. The method of claim 14, further comprising:
receiving the status or sensor information via a controller area network (CAN) communication.

19. The method of claim 14, wherein the other component is a central processing unit (CPU), a central control unit (CCU), or an electronic control unit (ECU).

20. The method of claim 14, wherein detecting the trigger event comprises:
detecting the trigger event based at least in part on analyzing the status or sensor information.

21. The method of claim 14, wherein the status or sensor information indicates a status associated with the OBU or the vehicle.

22. The method of claim 14, wherein detecting the trigger event comprises:
detecting the trigger event based at least in part on a status of an access link indicating that the access link is unavailable.

23. The method of claim 14, wherein the communication indicates at least one of:
a geographic location of the OBU,
vehicle information of the vehicle,
user information associated with the OBU, or
incident information associated with the trigger event.

24. The method of claim 14, wherein transmitting the communication causes a two-way communication session to be initiated.

25. The method of claim 14, wherein the communication is an emergency service communication.

26. A non-transitory computer-readable medium storing a set of instructions for wireless communication, the set of instructions comprising:

one or more instructions that, when executed by one or more processors of an on-board unit (OBU) of a vehicle, cause the OBU to:

receive status or sensor information from another component of the vehicle;

detect a trigger event associated with a satellite communication link, the trigger event being based at least in part on the status or sensor information;

determine a format of a communication based at least in part on a type or category of the trigger event; and automatically transmit the communication using the format via the satellite communication link based at least in part on the trigger event.

27. The non-transitory computer-readable medium of claim 26, wherein the one or more instructions further cause the OBU to:

establish a communication connection associated with the satellite communication link based at least in part on the trigger event and without instructions or input from a user.

28. The non-transitory computer-readable medium of claim 26, wherein the one or more instructions further cause the OBU to:

receive, from another device or the other component, information indicating that the OBU is to transmit the communication.

29. An apparatus for wireless communication, comprising:

means for receiving status or sensor information from another component;

means for detecting a trigger event associated with a satellite communication link, the trigger event being based at least in part on the status or sensor information;

means for determining a format of a communication based at least in part on a type or category of the trigger event; and means for automatically transmitting the communication using the format via the satellite communication link based at least in part on the trigger event.

30. The apparatus of claim 29, wherein the means for detecting the trigger event comprises:

means for detecting the trigger event based at least in part on a status of an access link indicating that the access link is unavailable.

\* \* \* \* \*